United States Patent
Lagorgette et al.

(10) Patent No.: US 10,884,381 B2
(45) Date of Patent: Jan. 5, 2021

(54) METHOD FOR AUTOMATICALLY ADJUSTING A PIECE OF TIME INFORMATION ON A WATCH

(71) Applicant: ETA SA Manufacture Horlogere Suisse, Grenchen (CH)

(72) Inventors: Pascal Lagorgette, Bienne (CH); Fabien Balli, Biel/Bienne (CH); Raphaël Balmer, Vicques (CH); Laurent Christe, Bienne (CH); Jean-Bernard Peters, Pieterlen (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 143 days.

(21) Appl. No.: 16/079,631

(22) PCT Filed: Jan. 17, 2017

(86) PCT No.: PCT/EP2017/050841
§ 371 (c)(1),
(2) Date: Aug. 24, 2018

(87) PCT Pub. No.: WO2017/144196
PCT Pub. Date: Aug. 31, 2017

(65) Prior Publication Data
US 2019/0049904 A1 Feb. 14, 2019

(30) Foreign Application Priority Data
Feb. 26, 2016 (EP) ..................................... 16157655

(51) Int. Cl.
*G04D 7/00* (2006.01)
*G04G 5/00* (2013.01)
(Continued)

(52) U.S. Cl.
CPC ............... *G04D 7/004* (2013.01); *G04G 5/00* (2013.01); *G04G 5/002* (2013.01); *G04R 20/26* (2013.01); *G06T 7/74* (2017.01)

(58) Field of Classification Search
CPC combination set(s) only.
See application file for complete search history.

(56) References Cited

U.S. PATENT DOCUMENTS

| | | | |
|---|---|---|---|
| 2005/0105401 A1* | 5/2005 | Akahane | G04R 20/00 368/187 |
| 2005/0151849 A1* | 7/2005 | Fitzhugh | G06K 9/325 348/207.99 |

(Continued)

FOREIGN PATENT DOCUMENTS

EP 2 458 458 A1 5/2012

OTHER PUBLICATIONS

International Search Report dated Mar. 1, 2017 in PCT/EP2017/050841 filed Jan. 17, 2017.
(Continued)

*Primary Examiner* — Helen Zong
(74) *Attorney, Agent, or Firm* — Oblon, McClelland, Maier & Neustadt, L.L.P.

(57) ABSTRACT

A method for adjusting a timepiece including: providing a portable object including a screen and a camera; testing accuracy of a piece of time information of the timepiece by using the camera of the portable object to compare with a piece of time information obtained from an external source; sending the time information from the portable object to the timepiece if a difference is detected, the timepiece including at least one phototransistor arranged at a case for receiving the time information, the timepiece to display the correct time information, the sending including: defining on the screen of the portable object an area of shape and dimensions similar to the case of the timepiece; holding the case
(Continued)

of the timepiece against the area; sequentially displaying black or white in the area, in a sequence of black and white corresponding to a luminous coding of the time information.

9 Claims, 4 Drawing Sheets

(51) Int. Cl.
*G06T 7/73* (2017.01)
*G04R 20/26* (2013.01)

(56) References Cited

U.S. PATENT DOCUMENTS

2013/0329040 A1 12/2013 Willemin et al.
2016/0070236 A1 3/2016 Willemin et al.
2016/0307371 A1* 10/2016 Ayers .................... G06T 19/006

OTHER PUBLICATIONS

Office Action dated Sep. 23, 2020 in China Patent Application No. 201780013349.0 (with English translation); 9 pgs.

* cited by examiner

METHOD FOR AUTOMATICALLY ADJUSTING A PIECE OF TIME INFORMATION ON A WATCH

The present invention relates to a method for adjusting a timepiece comprising a case, provided with a bracelet, in which a microcontroller powered by a cell or battery is arranged, said microcontroller comprising a time base and memory areas, and being used to send control signals to display means for displaying at least one piece of time information. By to adjust a timepiece, what is meant is to adjust a piece of time information given by the timepiece, for example the time, the perpetual calendar, etc.

PRIOR ART

At present two types of watches may be distinguished, namely mechanical watches, containing no electronic component, and what are known as electronic watches, which operate with a battery and a microcontroller. Electronic watches have developed to a very considerable extent, increasingly becoming what are known as smartwatches. These smartwatches are equipped with a communication module using an NFC and/or Bluetooth protocol for exchanging data with another device such as a cellphone (also called a smartphone) or a laptop computer or tablet. This data exchange currently allows data to be transferred from a sensor located in the watch to the cellphone or tablet, these devices having much greater computing power. This data exchange also enables notification or messaging data to be sent from the telephone to the watch in order to alert the user.

These electronic watches may use analog means such as hands, disks or electronic screens, using LCD, LED or OLED technologies, for displaying time information such as the time or date. The use of hands or disks requires the use of at least one motor and gearing such that time adjustment is carried out manually, which may lead to inaccuracy and discrepancies.

SUMMARY OF THE INVENTION

The object of the present invention is to overcome the drawbacks of the prior art by proposing a simple and reliable method for adjusting a piece of time information on a watch by using another device.

To this end, the invention relates to a method for adjusting a timepiece comprising a case, provided with a bracelet, in which a microcontroller powered by a cell or battery is arranged, said microcontroller comprising a time base and memory areas and being used to send control signals to display means for displaying at least one piece of time information, said method comprising the following steps:
  providing a portable object comprising a screen and a case in which there are an electronic circuit comprising a microcontroller, a display module, control means, a camera and a communication module, the electronic circuit being powered by a battery;
  testing the accuracy of a piece of time information of said timepiece by using the camera of the portable object to compare it with a piece of time information obtained from an external source;
  sending the time information from the portable object to the timepiece if a difference is detected, the timepiece comprising at least one phototransistor arranged on the case for receiving this time information, the timepiece being arranged to operate its display means to display this correct time information;
  checking that the correct information is displayed;
characterized in that the step of sending the time information comprises the following substeps:
  defining on the screen of the portable object an area of shape and dimensions similar to the case of the timepiece;
  holding the case of the timepiece against said area;
  sequentially displaying black or white in the entirety of the area or the entirety of a portion of this area, in a sequence of black and white corresponding to a luminous coding of the time information.

An advantage of this method is that it allows automatic adjustment of the timepiece, since the method consists in detecting a discrepancy between the time information displayed and a reliable piece of time information obtained from an external source, and sending a correction command to display the accurate time information.

The receiver of the watch is at least one phototransistor. If it detects black, the phototransistor generates an electrical signal corresponding to a low logic level, and if it detects white, the phototransistor generates a signal corresponding to a high logic level, or vice versa.

In one advantageous embodiment, the area defined on the screen of the portable object is divided into a first and a second portion, each portion displaying sequentially and independently of the other portion black or white in the displaying substep, the timepiece comprising two phototransistors arranged on the case, the first phototransistor being arranged so as to detect the sequence of the first portion, the second phototransistor being arranged so as to detect the sequence of the second portion.

Advantageously, the sequence of black and white of the first portion corresponds to a luminous coding of the time information, and the sequence of black and white of the second portion corresponds to a clock signal allowing a synchronous transmission between the portable object and the timepiece.

In one advantageous embodiment, the area defined on the screen of the portable object is divided into a first, a second and a third portion such that the first and second portion are physically separated by the third portion, each portion displaying sequentially and independently of the other portions black or white in the displaying substep, the timepiece comprising two phototransistors arranged on the case, the first phototransistor being arranged so as to detect the sequence of the first portion, the second phototransistor being arranged so as to detect the sequence of the second portion.

Advantageously, the sequence of black and white of the first portion corresponds to a luminous coding of the time information, and the sequence of black and white of the second portion corresponds to a clock signal allowing a synchronous transmission. In the third portion, arranged between the first and second portion, nothing is displayed, thereby allowing optical interference between the first and second portion to be avoided.

In an advantageous embodiment, the step of testing the accuracy of the displayed time information consists in:
  capturing, at a given instant, an image of the display means of the timepiece and an image of a piece of time information from an external source;
  processing the image of the display means of the timepiece by comparing the position of the display means with a series of reference points for detecting the displayed time information;

comparing the detected time information with the image of the time information from the external source.

In one advantageous embodiment, the step of checking that the correct information is displayed consists in:
    capturing, at a given instant, an image of the display means of the timepiece and an image of a piece of time information from an external source;
    processing the image of the display means of the timepiece by comparing the position of the display means with a series of reference points for detecting the displayed time information;
    comparing the detected time information with the image of the time information from the external source.

In another embodiment, the method further comprises a preliminary step of calibrating the timepiece, consisting in:
    sending to the watch, via the communication circuit, a command for displaying a specified piece of time information;
    sending a command to the display means via the microcontroller so that the display means can display said specified time information.

In one advantageous embodiment, the portable object is a smartphone or a tablet computer.

BRIEF DESCRIPTION OF THE DRAWINGS

The objects, advantages and characteristics of the invention will be more clearly apparent from the following description of at least one embodiment of the invention, provided solely by way of non-limiting example and illustrated by the appended drawings, in which.

DETAILED DESCRIPTION

Figure 1:
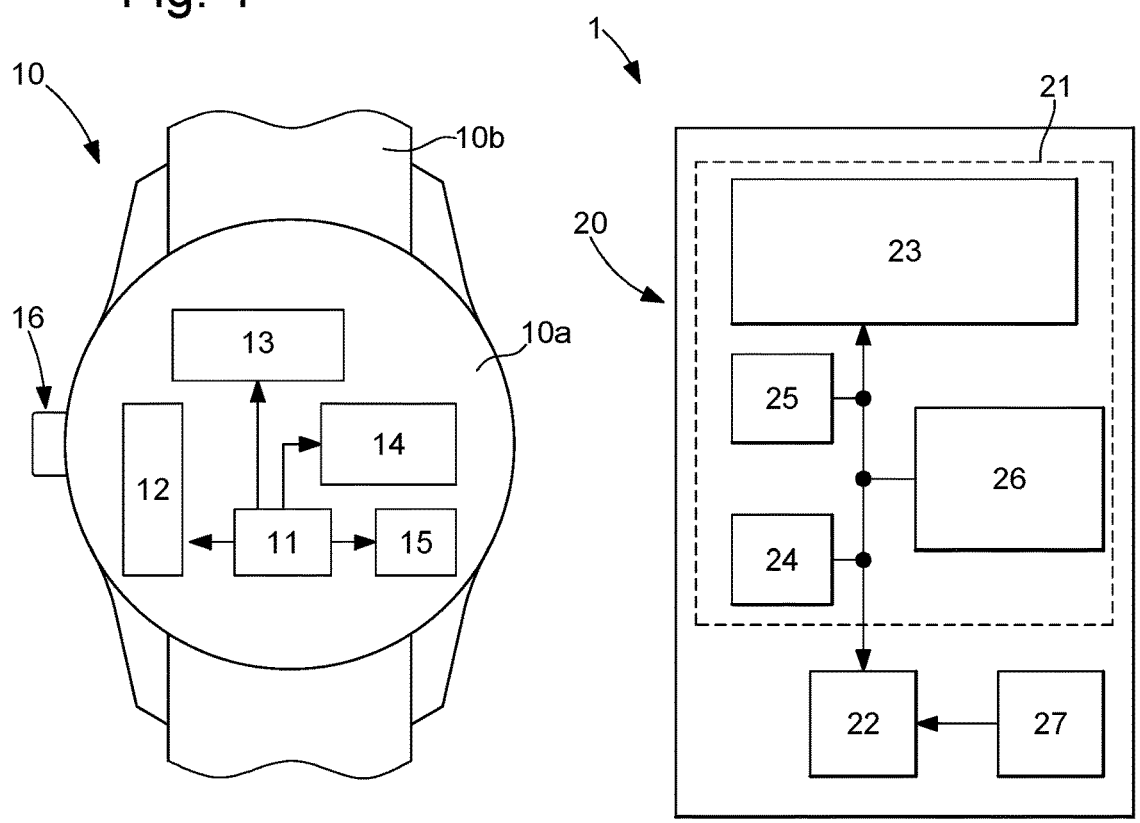
FIG. 1 shows schematically the assembly according to the invention.

In FIG. 1, an assembly 1 according to the invention is shown. Such an assembly 1 comprises at least a watch 10 and a portable electronic device 20 such as a cellphone or a tablet.

The watch 10 comprises a case 10a provided with a bracelet 10b. In this case, a microcontroller 11 powered by a power supply unit 12 such as a cell or a battery is arranged, said microcontroller 11 comprising a time base and memory areas. This microcontroller 11 is used to send control signals to display means 13, these display means 13 possibly comprising hands 13' or disks. These display means can display a piece of time information such as the time, the date, the day of the month, or the phase of the moon. The microcontroller 11 is also connected to control means 16 that may be a ring, push buttons or touch means, and a communication unit 14 using a protocol such as Bluetooth or NFC. The microcontroller 11 may also communicate with a sensor 15.

The portable electronic device 20 comprises a case in which an electronic circuit 21 is arranged. This electronic circuit 21 carries the microcontroller or processor 22, the display module 23, the control means 24, an optical detector acting as a camera or photographic device 25, and a communication module 26, the whole being powered by a battery 27.

Figure 2:
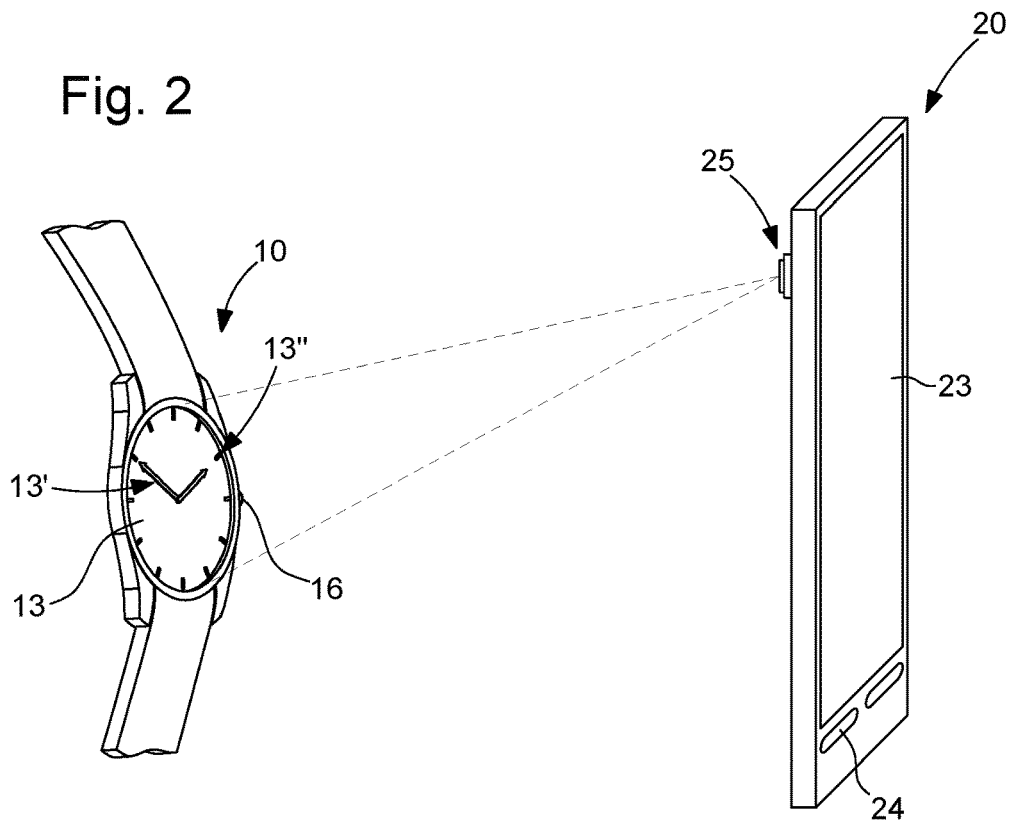
FIGS. 2, 3a, 3b show the method of adjusting a timepiece.

The present invention then aims to provide a method for adjusting at least one piece of time information via the portable electronic device. For this purpose, the first step is to detect the presence of a time discrepancy between the information displayed by the watch 10 and a reliable source. For this purpose, this first step is to use the camera 25 to take a photograph of the display means 13 of the watch. This photograph is used by a processing program. This processing program analyses the position of the display means 13 relative to reference points on the dial. If the display means 13 are hands 13', the reference points are the indices 13" on the dial 13''', as shown in FIG. 2.

For this purpose, the increment in the positioning of the indices must be large enough to avoid problems of parallax. The risk of the appearance of problems of parallax increases with the number of hands 13' on the electronic movement and with the distance between each hand 13' and the dial 13'''. The pitch of the hand 13' must therefore be adapted according to the distance between the hand and the dial.

The processing program will make reference to the indices 13". It will also check the ellipse formed by the dial 13''', the glass or the bezel, in order to assess the parallax. If the ellipse is too "flattened", this means that there will be an excessively large parallax error. In the ideal case, the application or the processing program should see a circle.

When the time indication of the display means 13 has been determined, the processing program compares the detected time information with a time source. This time source may be obtained from the internal time base of the portable electronic device 20 or from an external source. This external source may be a radio frequency signal, or may be obtained from a network such as the internet. Preferably, a photograph of the time source is taken at the same time as the photograph of the display means 13, so that the detected time information can be compared with the reliable source, all at the same instant.

If the processing program detects an anomaly, that is to say a difference between the displayed time information and the source used, an adjustment operation is performed.

A second step consists in sending a correct piece of time information to the watch 10. This time information is sent via optical modulation from the portable electronic device 20 to the watch 10, which comprises a receiver means. For this purpose, the sensor 15 acts as a receiver means, and is an optical sensor or phototransistor 15' capable of detecting a luminous flux and converting it into an electrical signal.

This phototransistor 15' is advantageously located under the dial 13''', the latter having an opening or a transparent portion, or being made from a partially transparent material. Clearly, this photoreceiver may be arranged on the bottom of the casing or on the edge of this casing.

Figure 3A:
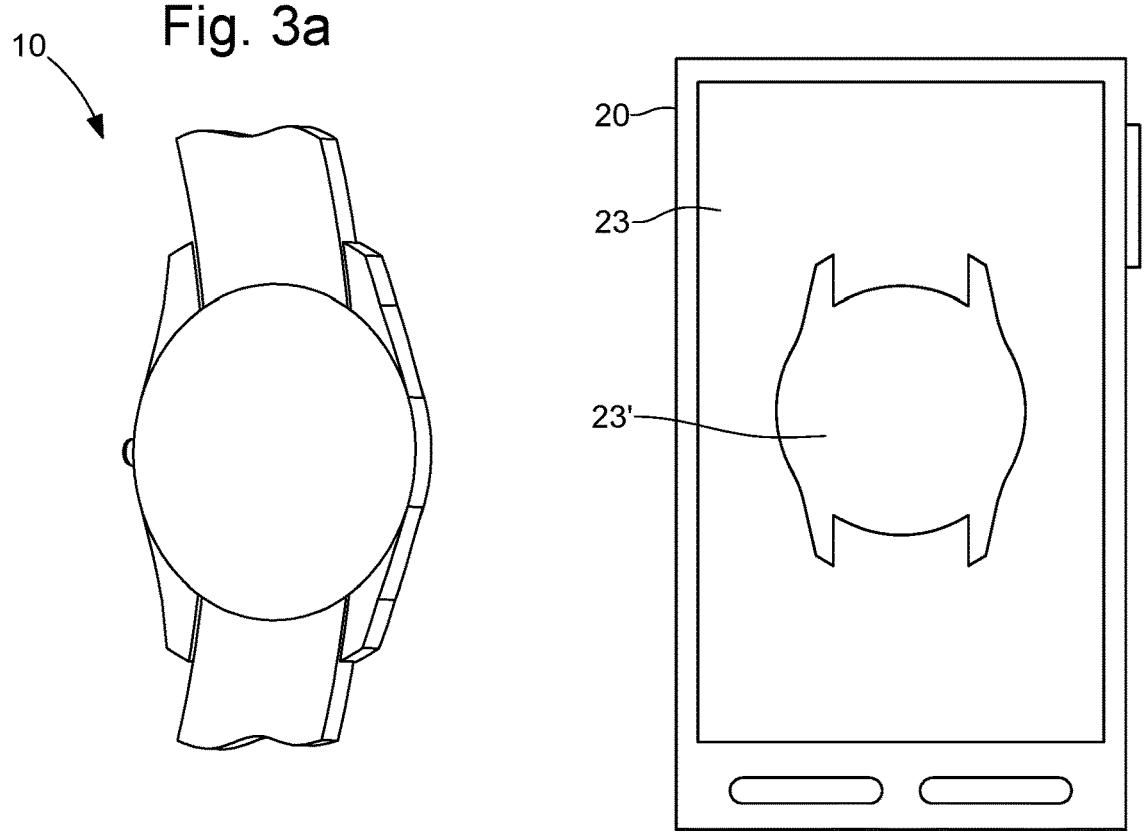
Figure 3B:
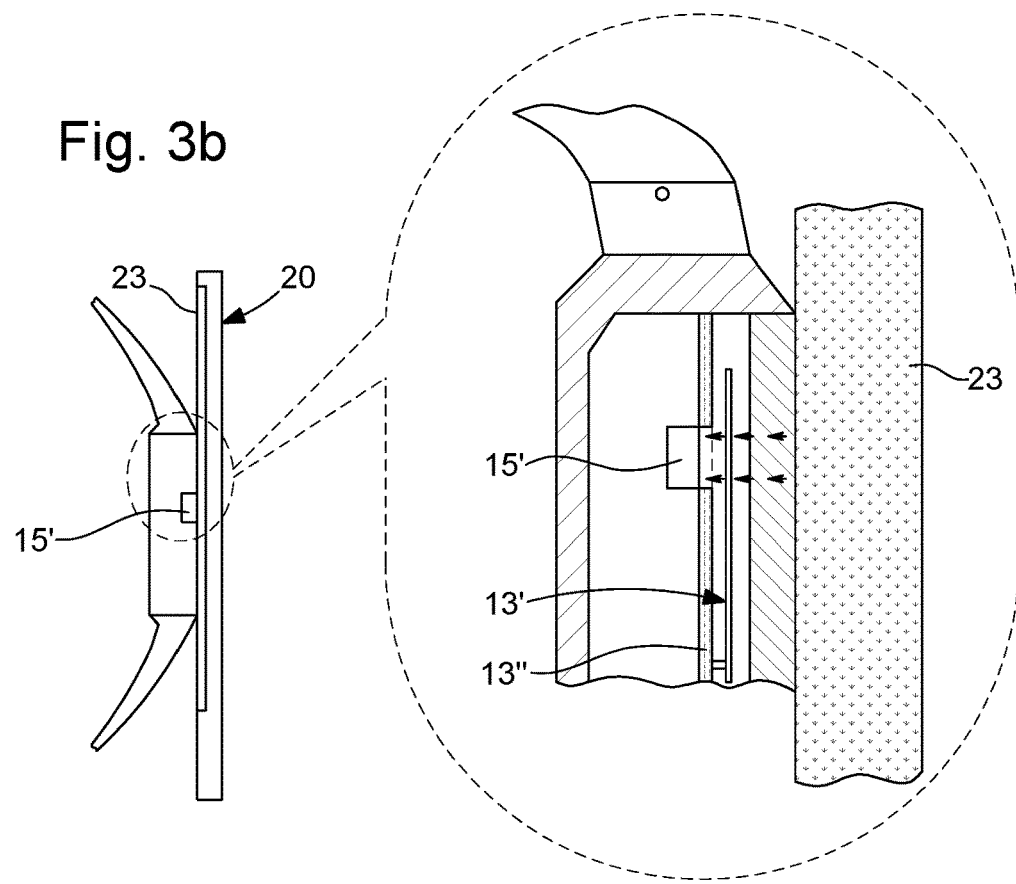

To produce a light signal, the method advantageously uses the display screen 23 of the portable electronic device 20. The use of this screen cleverly makes it possible to display, on the surface of the screen 23, an area 23' whose shape and surface area are substantially identical to the shape and dimensions of the area where the photoreceiver is arranged. This means that, if the photoreceiver is arranged at the dial, the surface area and shape of the area 23' will be substantially identical or similar to those of the dial 13''' of the watch 10. Thus, the user may hold the watch 10 against the area 23' of the screen of the portable electronic device 20 so that the dial 13''' faces said area 23'. This specific area 23' will be the area through which the optical modulation will be carried out, as shown in FIGS. 3a and 3b. This configuration ensures that the light captured by the phototransistor 15' will be the light generated by said display screen 23, and avoids losses of luminosity, since the watch is held against the display screen 23.

Figure 4A:
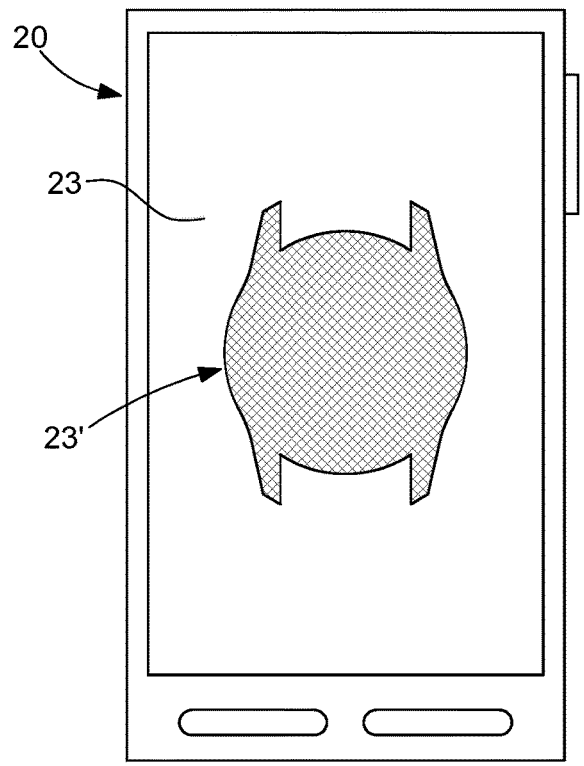
FIGS. 4a and 4b show an asynchronous transmission mode for sending data to the timepiece.
Figure 4B:
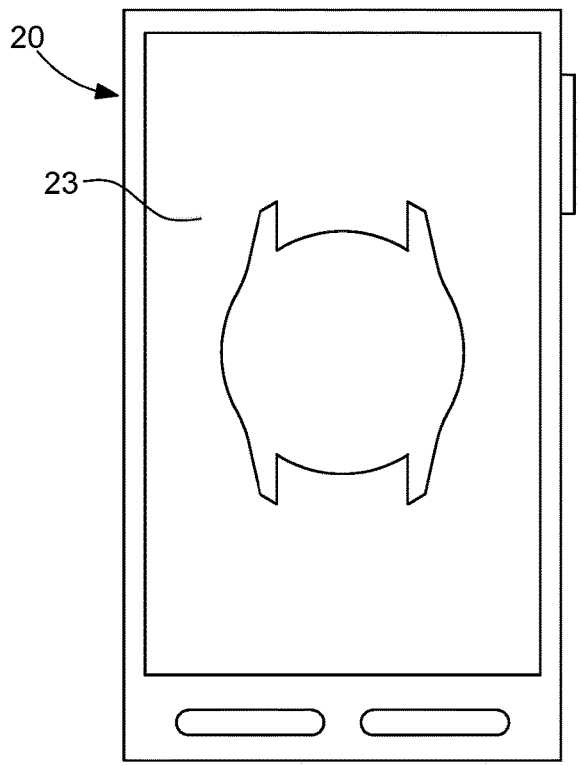

Optical modulation, which may be an asynchronous procedure, is used to transmit a piece of information. For this asynchronous optical transmission, the area 23' of the screen 23, whose shape and surface area are substantially identical to the shape and dimensions of the dial 13''' of the watch 10, is commanded to display either black, signifying a logical "0", or a white light, signifying a logical "1", or vice versa, the whole forming a piece of binary information as shown in FIGS. 4a and 4b.

Figure 5:
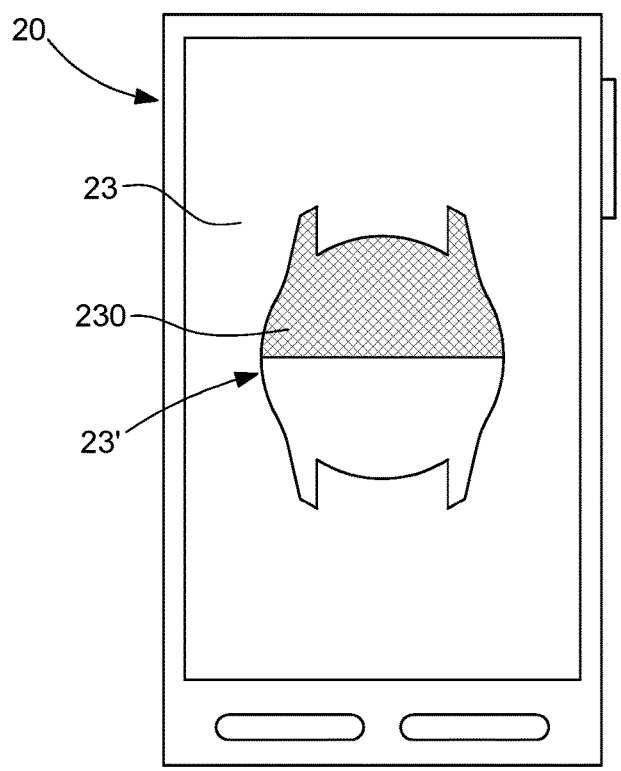
FIGS. 5 to 7 show an synchronous mode of transmission to the timepiece.
Figure 6:
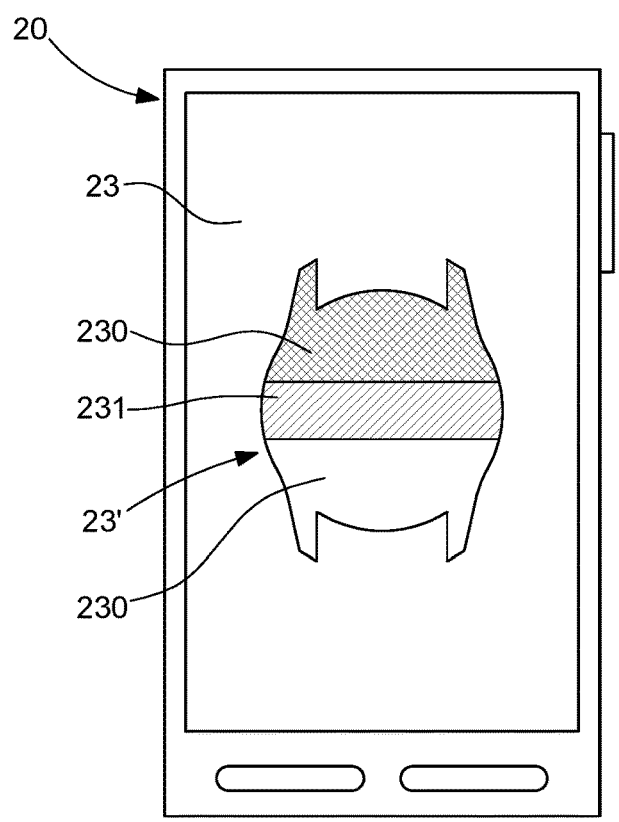
Figure 7:
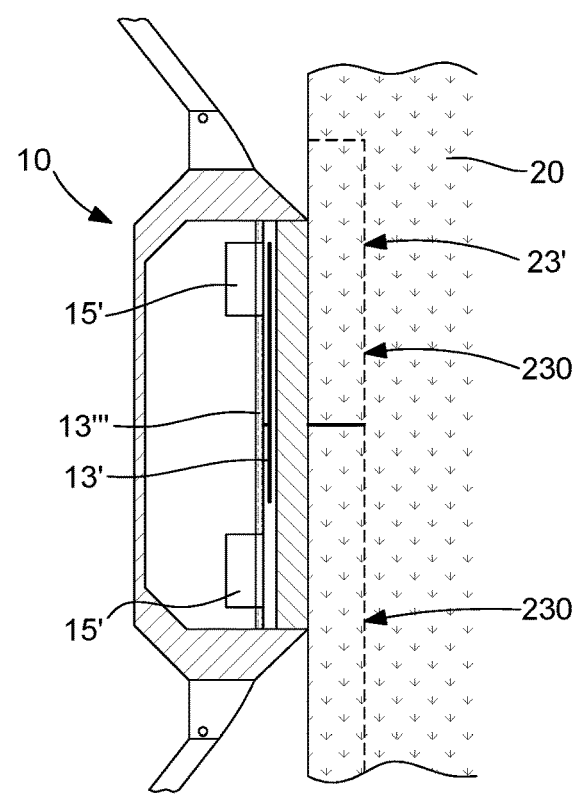

In a variant, provision may be made to carry out synchronous data transmission, as shown in FIGS. 5 to 7. For this purpose, the watch 10 must be provided with two phototransistors 15'. Ideally, these will be arranged in a diametrically opposed way, so as to be separated from one another. This is because the principle of synchronous optical transmission is that of providing transmission of a clock signal and transmission of a data signal encoding the time information to be transmitted. The area 23' of the display screen 23 whose shape and surface area are substantially identical to the shape and dimensions of the watch dial is then divided into at least two parts 230, each part 230 enabling a clock signal or data to be sent to the phototransistors 15'. Synchronous transmission is characterized by the fact that the transmitter and receiver timed by the same clock. The receiver receives the information continuously (even when no bits are transmitted), at the rate at which the transmitter sends it. Each part 230 of the screen 23 then becomes white or black, so as to send a logical '0' or a logical '1'.

Cleverly, provision may be made for the area 23' of the display screen, whose shape and surface area are substantially identical to the shape and dimensions of the watch dial 13''', to be divided into at three parts with two areas known as active areas 230, these areas then becoming white or black in order to send a logical '0' or a logical '1'. A third area, called the passive area, 231 is located between the two active areas 230. This passive area 231 acts as a dead area, to prevent optical interference between the two active areas 230. This is because, if the alignment is imperfect, this dead area 231 acts as a buffer to prevent the active areas from sending an optical signal to the phototransistor that is not dedicated to them.

Clearly, the invention is not limited to the embodiment described, and therefore, in the case of optical transmission, the phototransistor or phototransistors may be arranged on the caseband or on the bottom of the watch.

When the data have been transmitted to the watch, the microcontroller 11 of the watch sends commands to the display means so that they can display a correct piece of information. If hands are present, the microcontroller 11 sends a command to actuate the motors and move the hands.

In a third step, the aim is to check that the correction has actually been made. For this purpose, this step consists in using the camera 25 to take a photograph of the display means 13. This photograph is then used by a processing program. This processing program analyses the position of the display means relative to reference points, and compares the time information with a reliable source.

In a variant of this third step, the checking may be performed by data transfer by wireless transmission of the Bluetooth type, the watch 10 sending the data on the time information that it is displaying.

In a first variant, a preliminary step is provided. This preliminary step consists in a step of calibrating the detection of the hands. This is because, depending on the luminosity conditions, there may be patterns of shadows or reflections that may lead to incorrect detection of the time information. This calibration step therefore consists in sending a command from the portable electronic device to the watch 10, via their communication circuit 14, 26, to display a specified piece of time information to be displayed, such as 10.10. Having received this command, the microcontroller 11 sends a command to the display means 13 so that these can display said specified time information.

When this information is displayed, the detection process is initiated, so that the portable object 20 uses its camera 25 to detect the displayed time information. If the detected time information is equal to the specified time information, then no other action is taken, and the watch can again display a current piece of time information. Conversely, if the detected time information is not equal to the specified time information, then a correction is made. This correction may take the form of an offset, that is to say a value to be added to obtain the correct value. This correction may be followed by another test phase consisting in re-detecting the displayed time information and seeing whether the correction has been taken into account.

In this variant, provision may also be made for synchronizing the display means 13, such as the hands. For this purpose, the specified time information is brought to the user's attention via the display means of the electronic portable object. This specified time information is sent to the watch so that the watch can use its display means to display it. It is then a simple matter for the user to check that the specified time information is correct, and to modify this display if any discrepancies are noted. Preferably, this synchronization of the hands is performed before the calibration of the detection of the hands.

In a second variant embodiment, the watch is equipped with a solar cell to provide an energy supply for recharging a battery or accumulator. Cleverly, this solar cell is used as a photoreceiver during the data transmission. In a solar cell, there is a relation of proportionality between the light flux captured by the solar cell and the current that it produces (the charging current). The current produced/converted by the solar cell may be measured, for example by short-circuiting the solar cell via a shunt resistor. This current provides an image of the light flux entering the solar cell.

The relation between the captured light flux and the current is such that, by modulating the size of the active surface of the transmitting area of the smartphone, for a fixed luminous intensity, it is possible to modulate the current converted/produced by the solar cell. On this bases, it is possible to carry out transmission which is ternary, rather than purely binary, using a single optical receiver. The provision of a plurality of current levels enables more complex, and therefore more reliable, coding to be used. For example, a Manchester coding may be used.

A first advantage is that the clock signal may be combined with the data signal, allowing synchronous transmission, which is more reliable than asynchronous transmission.

The second advantage is that the solar cell is used alternately as an energy source and as a data receiver.

A third advantage is that the optical transmission becomes independent of the luminous intensity of the transmitter, provided that the latter is stable during the transmission. This is because amplitude modulation is carried out by reducing or increasing the active surface, making it easy to adapt from one smartphone to another where the adjustments of luminous intensity differ from one to the other.

Clearly, the different embodiments of the invention described above may be modified and/or improved and/or combined in various ways, which will be apparent to those skilled in the art, without departing from the scope of the invention defined by the appended claims.

Thus, it is possible to adjust the totality of the time information of a watch 10. There are known watches that display not only the time but also the date, month and day, as well as showing whether or not the year is a leap year. Therefore, when there is a prolonged period of inactivity or when repairs are made, the present invention enables all the time information delivered by the watch to be adjusted or updated in a single operation.

The invention claimed is:

1. A method for adjusting a timepiece including a case, including a bracelet, in which a microcontroller powered by a cell stack or battery is arranged, the microcontroller including a time base and memory areas and used to send control signals to a display to display at least one piece of time information, the method comprising:

testing accuracy of a piece of time information of the timepiece by using a camera of a portable object to compare with a piece of time information obtained from an external source, the portable object including a screen and a second case in which there is electronic circuitry including a second microcontroller, a second display, the camera, and a communication circuit, the electronic circuitry being powered by a second battery;

sending the time information from the portable object to the timepiece when a difference is detected, the timepiece including at least one phototransistor arranged on the case for receiving the time information, the timepiece configured to operate the display to display a correct time information; and checking that the correct time information is displayed, wherein the sending the time information from the portable object to the timepiece further comprises:

defining, on the screen of the portable object, an area of shape and dimensions similar to the case of the timepiece, instructing the case of the timepiece to be held against the defined area, and sequentially displaying black or white in an entirety of the area or an entirety of a portion of this area, in a sequence of black and white corresponding to a luminous coding of the time information.

2. The adjusting method as claimed in claim 1, wherein the area defined on the screen of the portable object is divided into a first portion and a second portion, each portion displaying sequentially and independently of the other portion black or white in the displaying substep, the timepiece comprising two phototransistors arranged on the case, the first phototransistor configured to detect the sequence of the first portion, the second phototransistor configured to detect the sequence of the second portion.

3. The adjusting method as claimed in claim 2, wherein the sequence of black and white of the first portion corresponds to a luminous coding of the time information, and the sequence of black and white of the second portion corresponds to a clock signal allowing a synchronous transmission between the portable object and the timepiece.

4. The adjusting method as claimed in claim 1, wherein the area defined on the screen of the portable object is divided into a first portion, a second portion, and a third portion such that the first and second portions are physically separated by the third portion, each portion displaying sequentially and independently of the other portions black or white in the displaying, the timepiece comprising two phototransistors arranged on the case, the first phototransistor configured to detect the sequence of the first portion, the second phototransistor configured to detect the sequence of the second portion.

5. The adjusting method as claimed in claim 4, wherein the sequence of black and white of the first portion corresponds to a luminous coding of the time information, and the sequence of black and white of the second portion corresponds to a clock signal allowing a synchronous transmission.

6. The adjusting method as claimed in claim 1, wherein the testing the accuracy of the displayed time information comprises:

capturing, at a given instant, an image of the display of the timepiece and an image of a piece of time information from an external source;

processing the image of the display of the timepiece by comparing the position of the display with a series of reference points for detecting the displayed time information;

comparing the detected time information with the image of the time information from the external source.

7. The adjusting method as claimed in claim 1, wherein the checking that the correct information is displayed comprises:

capturing, at a given instant, an image of the display of the timepiece and an image of a piece of time information from an external source;

processing the image of the display of the timepiece by comparing the positions of the display with a series of reference points for detecting the displayed time information;

comparing the detected time information with the image of the time information from the external source.

8. The adjusting method as claimed in claim 1, further comprising a preliminary calibrating the timepiece comprising:

sending to the timepiece, via the communication circuit, a command for displaying a specified piece of time information;

sending a command to the display means via the microcontroller so that the display can display the specified time information.

9. The adjusting method as claimed in claim 1, wherein the portable object is a smartphone or a tablet computer.

* * * * *